(No Model.)
F. G. SHEPARD, A. J. HOAG & A. THOMSON.
REVERSING GEAR FOR ENGINES.
No. 282,932. Patented Aug. 7, 1883.
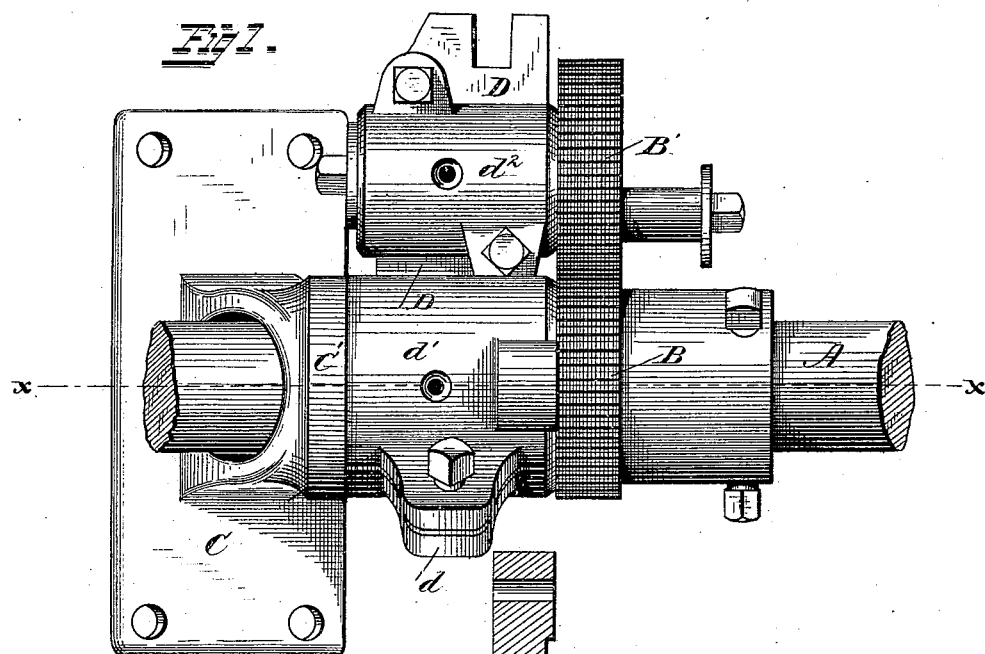
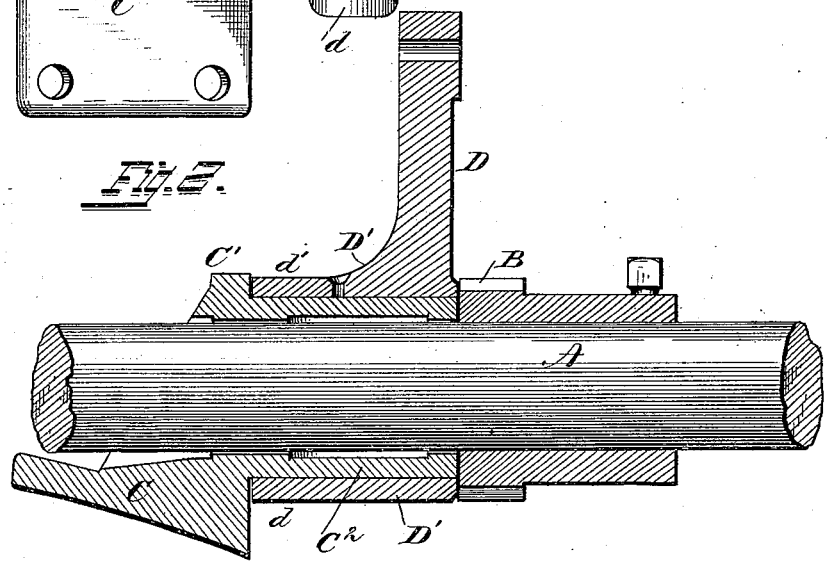
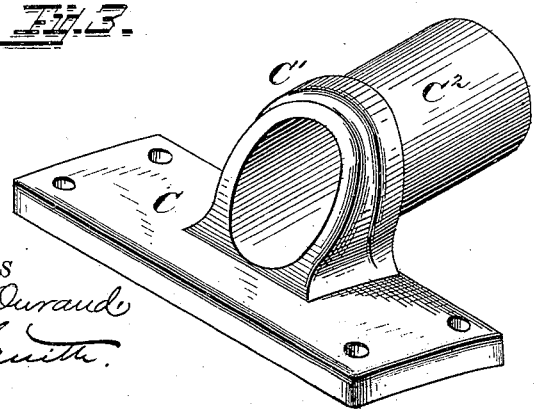
WITNESSES
Franck L. Ouraud
Rex Smith
Freedom G. Shepard
Andrew J. Hoag
Andrew Thomson
INVENTORS.
by A. L. Smith,
Attorney.

UNITED STATES PATENT OFFICE.

FREEDOM G. SHEPARD, ANDREW J. HOAG, AND ANDREW THOMSON, OF BATTLE CREEK, MICHIGAN, ASSIGNORS TO NICHOLS, SHEPARD & COMPANY, OF SAME PLACE.

REVERSING-GEAR FOR ENGINES.

SPECIFICATION forming part of Letters Patent No. 282,932, dated August 7, 1883.

Application filed February 5, 1883. (No model.)

*To all whom it may concern:*

Be it known that we, FREEDOM G. SHEPARD, ANDREW J. HOAG, and ANDREW THOMSON, all of Battle Creek, county of Calhoun, State of Michigan, have invented a new and useful Improvement in Reversing-Gear for Steam-Engines, of which the following is a full, clear, and exact description, reference being had to the accompanying drawings, making part of this specification.

Our invention relates to that class of reversing-gear employing two gears of equal diameter, one secured to and rotating with the engine-shaft, the other (to which the crank wrist or pin actuating the valve-rod is connected) being mounted upon a gear-plate adjustable around the engine-shaft as a center, for reversing the engine; and it consists in a novel manner of supporting the adjustable gear-plate independently of the engine-shaft and out of contact therewith, but in such relation thereto as to be adjustable around said shaft as a center, whereby the frictional resistance, wear, and loss of power consequent upon mounting said plate directly on the rotating engine-shaft are avoided, as hereinafter explained.

In the accompanying drawings, Figure 1 represents a plan view of a reversing-gear, gear-plate, and its supporting-standard, with a portion of the engine-shaft sufficient to show our invention. Fig. 2 is a vertical section through the same, and Fig. 3 is a perspective view of the improved gear-plate-supporting standard detached.

In the class of reversing-gear referred to the adjustable or swinging gear-plate has heretofore been supported directly on the engine-shaft, as illustrated in Letters Patent granted to A. J. Hoag, July 26, 1881, the rotating shaft forming the journal upon which the gear-plate was swung or adjusted. In such construction the box portion of the gear-plate surrounding the shaft required to be very nicely and accurately fitted to the shaft and to be faced inside with Babbitt metal to afford proper wear. The strain on the swinging arm consequent upon its support, at a distance from the engine-shaft, of a gear meshing with and actuated from the gear on said engine-shaft, and the necessary adjustment of said gear around or relative to said shaft, in reversing, renders it necessary to make the box or sleeve portion of the swinging gear-plate long and close-fitting, in order to sustain said strain and to avoid lost motion and lateral play, which would throw the two gears out of proper working or parallel relation to each other. Further, the engine-shaft runs at high speed, and is liable to wear, cut, and heat the box, which, in consequence, requires frequent and careful adjustment to insure the proper working of the gear. If the box be drawn too tight in the effort to avoid loss of motion and lateral play, it causes heavy friction on the shaft and consequent loss of power, and, the driving force being necessarily applied at one side of the swinging gear-plate, the box is caused to wear unequally or upon opposite sides, at the opposite ends—an action resulting in permitting a wabbling or lateral play of the gear-plate, and necessitating frequent and careful refitting, as explained.

Our invention is designed to remedy these difficulties, and to this end we employ a support for the swinging gear-plate, attached to the boiler or engine-frame, and adapted to uphold said gear-plate out of contact with but adjustable around the engine-shaft as a center, as will be explained with reference to the drawings, in which—

A represents the main engine-shaft; B, a spur-gear secured to and rotating with said shaft, the latter being mounted in suitable bearings on the boiler or engine-frame in any usual manner. To the boiler, engine-frame, or other suitable support is secured a bracket, C, having an upright perforated standard, C', upon one side of which is formed a sleeve, $C^2$, which forms a pivotal bearing for the adjustable or swinging gear-plate D, carrying the spur-gear B', meshing with and driven by the gear B on the engine-shaft. The box-sleeve or box portion D' of the gear-plate D is made in two parts, $d$ and $d'$, facilitating its application and removal, and the part $d$ is provided also with a half-bearing for the shaft of the gear B', the other half-bearing being formed in a cap, $d^2$, which, with part $d'$, is adapted to be secured to the part $d$ by bolts, as shown. The sleeve $C^2$ surrounds the shaft A, and is concentric therewith, but is not designed as a bearing for said shaft, and is therefore by preference slightly enlarged in internal diameter, so as to be out of actual contact with said shaft. It serves to support the gear-plate independently of or removed from contact with the shaft, but in such relation thereto that its swinging movements, in being adjusted to reverse the engine, shall be around said shaft as a center.

The journal-sleeve C² may, if desired, form one of the bearings for the engine-shaft; but it is preferred to make it separate from such bearings and to remove it, by enlargement of its bore, from actual contact with the shaft, thereby obviating the wear which would otherwise result, and making it to serve only as a fixed pivotal support for the swinging gear-plate. The wear upon the latter resulting from pivoting it directly on the rotating engine-shaft is avoided, and the necessity for the accurate fitting and the frequent adjustment and refitting referred to, as consequent upon mounting it directly on said shaft, are obviated.

The construction and arrangement of the reversing-gear, apart from the manner of journaling the gear-plate above described, are similar to those described in the patent to Hoag above referred to, and need not, therefore, be herein described.

The form of the support for the gear-plate may of course be varied, so long as it is adapted to uphold said gear-plate in the described relation to the engine-shaft—that is to say, out of contact with but adjustable around said shaft as a center in such manner as to hold the two gears always in proper working relation to each other, as explained.

Having now described our invention, what we claim as new is—

1. In a reversing-gear for steam-engines, the two gears of equal diameter, one on the engine-shaft and the other mounted on an axis on a swinging plate or frame adjustable around said engine-shaft as a center, in combination with a support arranged out of frictional contact with the shaft and upholding said gear-plate, substantially as described.

2. The gear-plate-supporting standard or bracket provided with the sleeve surrounding the engine-shaft and concentric therewith, in combination with the gear-plate mounted on said sleeve and adjustable around said shaft as a center, substantially as described.

3. The combination, in a reversing-gear for steam-engines, of the gear B on the engine-shaft, the gear B', meshing with the gear B, and provided with a crank-wrist for actuating the valve-rod, the swinging gear-plate D, supporting said gear B' and adjustable around said engine-shaft as a center, and a support for said gear-plate, upholding it out of contact with the engine-shaft, but permitting its adjustment around said shaft as a center, substantially as described.

In testimony whereof we have hereunto set our hands this 1st day of February, A. D. 1883.

FREEDOM G. SHEPARD.
ANDREW J. HOAG.
ANDREW THOMSON.

Witnesses:
  A. C. KINGMAN,
  E. C. NICHOLS.